(12) United States Patent
Girnus et al.

(10) Patent No.: US 12,104,671 B2
(45) Date of Patent: Oct. 1, 2024

(54) CRANKSHAFT ASSEMBLY WITH A CENTRIFUGAL PENDULUM ATTACHED TO THE CRANKSHAFT

(71) Applicant: Schaeffler Technologies AG & Co. KG, Herzogenaurach (DE)

(72) Inventors: Mathias Girnus, Bühl (DE); Pascal Strasser, Aschbach (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/008,728

(22) PCT Filed: May 18, 2021

(86) PCT No.: PCT/DE2021/100439
§ 371 (c)(1),
(2) Date: Dec. 7, 2022

(87) PCT Pub. No.: WO2021/254558
PCT Pub. Date: Dec. 23, 2021

(65) Prior Publication Data
US 2023/0213085 A1    Jul. 6, 2023

(30) Foreign Application Priority Data
Jun. 17, 2020   (DE) .......................... 102020115930.7

(51) Int. Cl.
*F16F 15/14*     (2006.01)
*F16C 3/10*      (2006.01)

(52) U.S. Cl.
CPC .............. *F16F 15/145* (2013.01); *F16C 3/10* (2013.01); *F16C 2226/60* (2013.01); *F16C 2360/22* (2013.01)

(58) Field of Classification Search
None
See application file for complete search history.

(56) References Cited

FOREIGN PATENT DOCUMENTS

| DE | 102014221413 |      | 4/2014 |
|----|--------------|------|--------|
| DE | 102014100191 |      | 7/2014 |
| DE | 102015213113 |      | 1/2016 |
| DE | 102016121397 |      | 5/2017 |
| DE | 102017120426 |      | 3/2018 |
| DE | 102018130517 |      | 6/2020 |
| DE | 102018130517 | A1 * | 6/2020 |

* cited by examiner

*Primary Examiner* — Vicky A Johnson
(74) *Attorney, Agent, or Firm* — Volpe Koenig

(57) ABSTRACT

A crankshaft assembly for a motor vehicle drive train, including a crankshaft segment and a centrifugal pendulum secured thereon, which has a carrier secured to the crankshaft segment and at least one pendulum mass that moves relative to the carrier along a predetermined track. The crankshaft assembly has a friction unit connected to the carrier, which rests on the at least one pendulum mass such that, with a relative movement of the pendulum mass in relation to the carrier, the friction unit applies a frictional torque on the pendulum mass counteracting the relative movement, wherein the friction unit extends over a peripheral section of less than 360°.

19 Claims, 3 Drawing Sheets

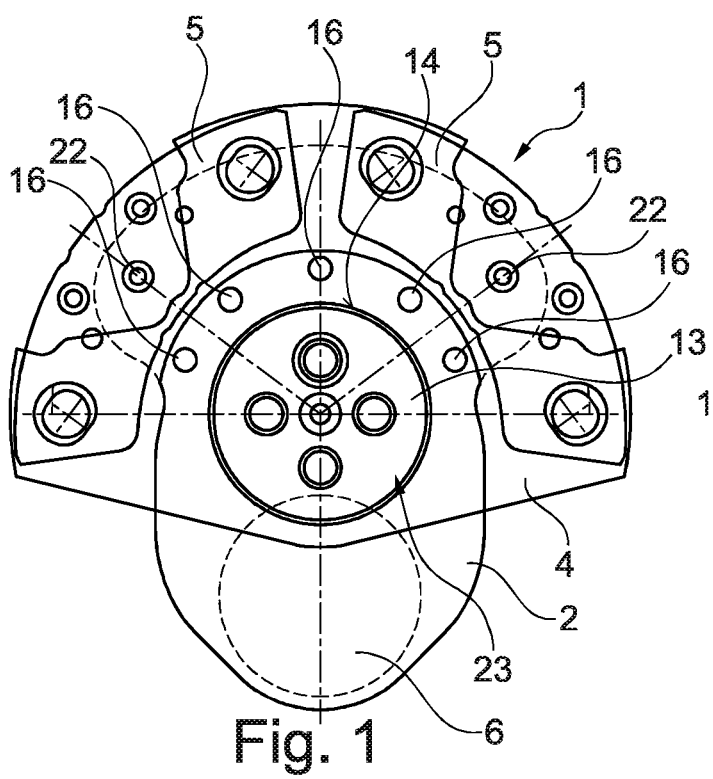
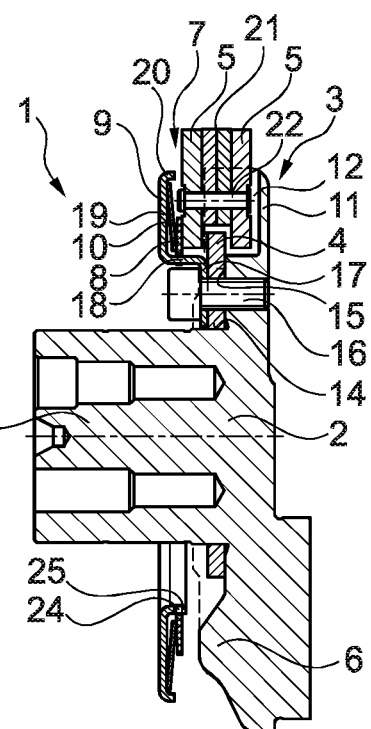
Fig. 1
Fig. 2
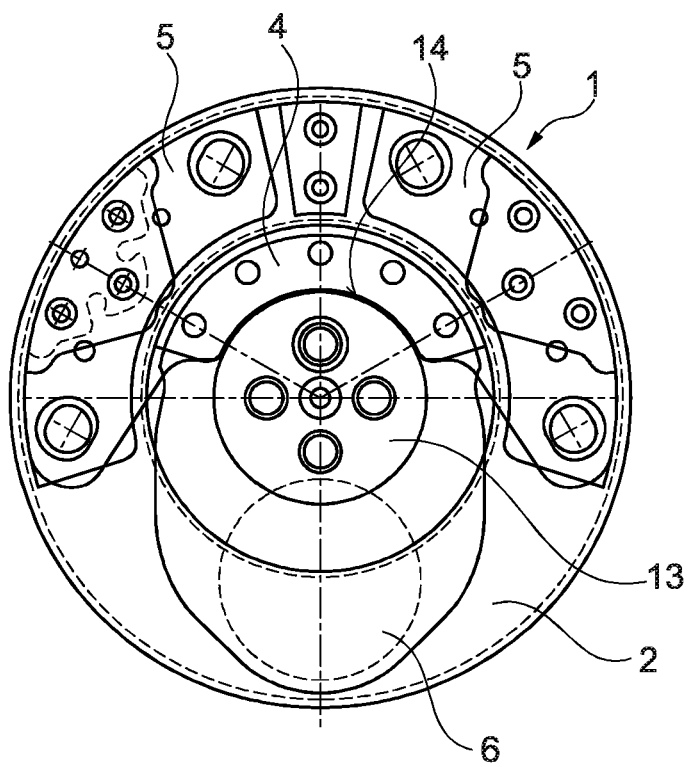
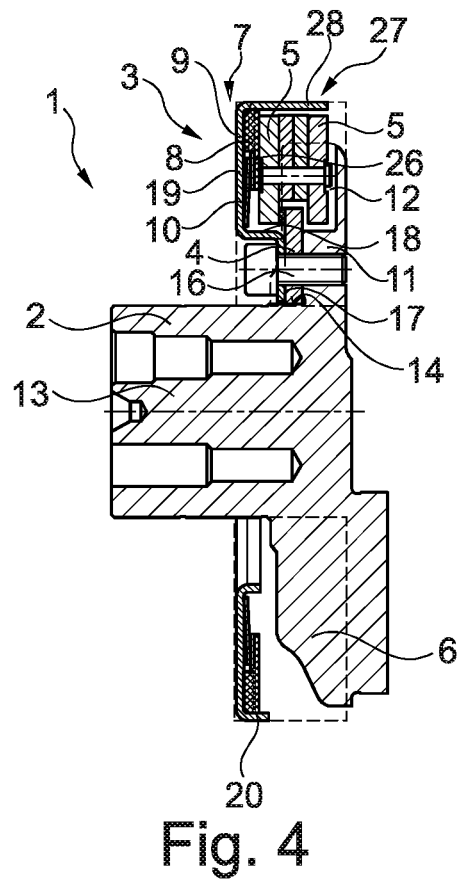
Fig. 3
Fig. 4

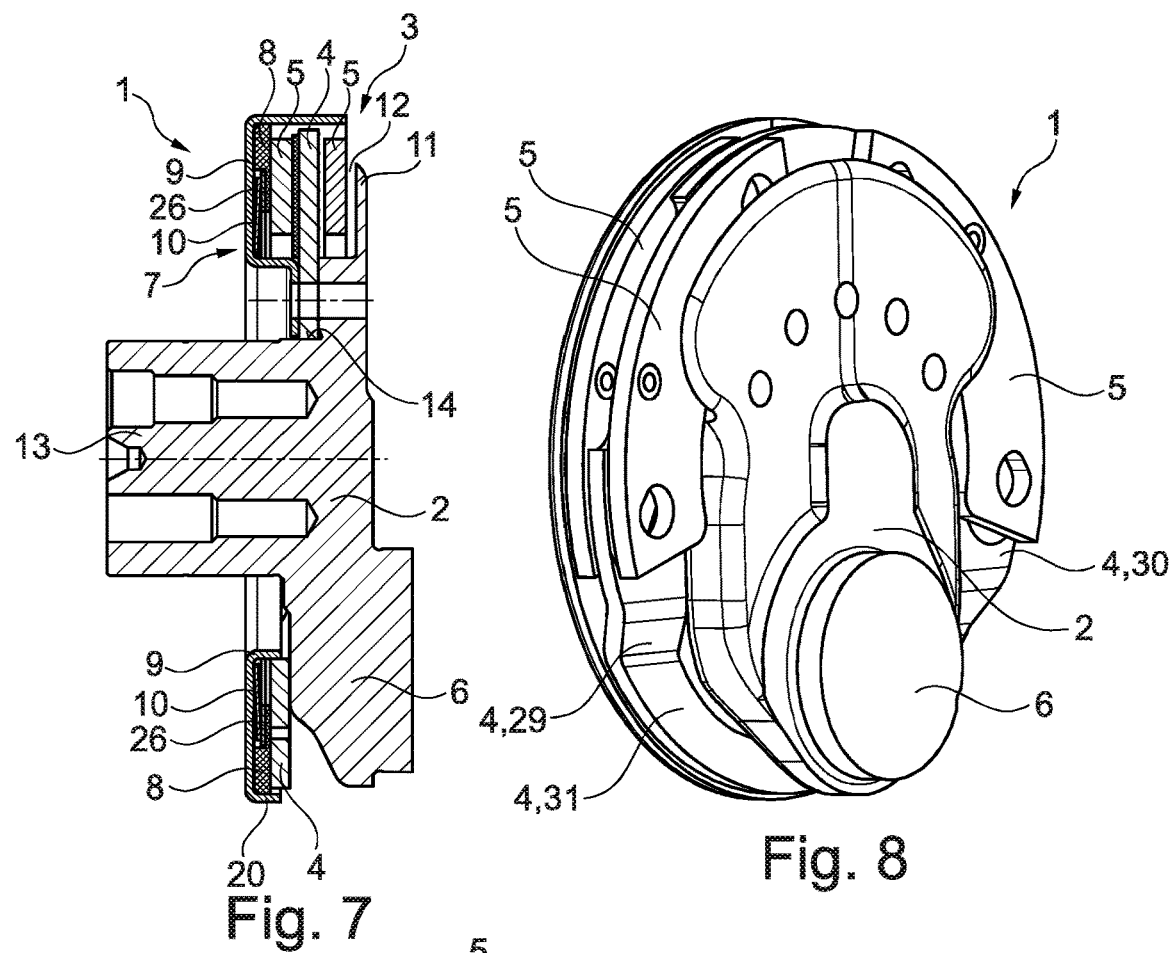
Fig. 7
Fig. 8
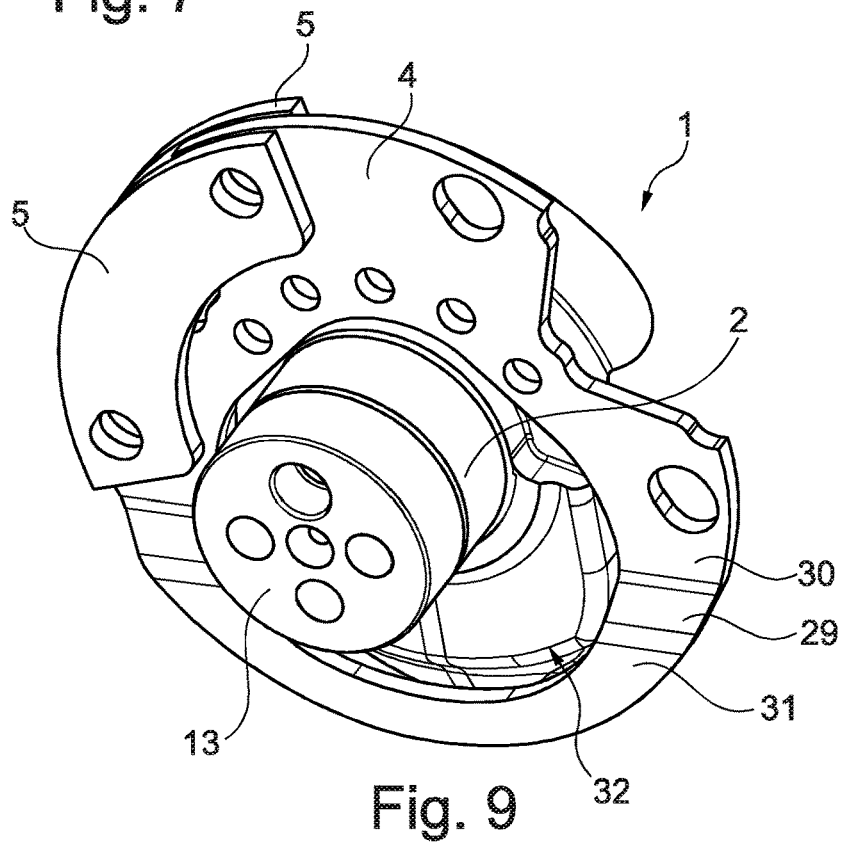
Fig. 9

CRANKSHAFT ASSEMBLY WITH A CENTRIFUGAL PENDULUM ATTACHED TO THE CRANKSHAFT

CROSS-REFERENCE TO RELATED APPLICATIONS

This application is the U.S. National Phase of PCT Appln. No. PCT/DE2021/100439, filed May 18, 2021, which claims the benefit of German Patent Appln. No. 10 2020 115 930.7, filed Jun. 17, 2020, the entire disclosures of which are incorporated by reference herein.

TECHNICAL FIELD

The disclosure relates to a crankshaft assembly for a motor vehicle drive train. The crankshaft assembly has a crankshaft segment and a centrifugal pendulum secured thereon. The centrifugal pendulum has a carrier secured to the crankshaft segment and at least one pendulum mass that moves relative to the carrier along a predetermined track.

BACKGROUND

Attaching a centrifugal pendulum to a crankshaft in order to absorb natural vibrations of the crankshaft is already known from the prior art. For example, DE 10 2016 121 397 A1 and DE 10 2017 120 426 A1 each disclose a pendulum assembly radially attached to an outer peripheral surface of the crankshaft.

However, in the prior art there remains the disadvantage that the provision of a centrifugal pendulum requires additional installation space and increases the overall weight of the crankshaft, and in addition, that connecting the centrifugal pendulum to the crankshaft can weaken the crankshaft.

SUMMARY

It is therefore the object of the disclosure to avoid or at least to mitigate the disadvantages of the prior art. In particular, a crankshaft assembly is to be provided in which a centrifugal pendulum can be designed in a space-efficient and weight-efficient manner and attached to the crankshaft without negatively impacting on the functionality, strength, manufacturability and/or costs.

This object is achieved by a crankshaft assembly having one or more of the features disclosed herein. Advantageous developments are described below and in the claims.

Accordingly, the crankshaft assembly has a crankshaft segment, i.e., an, in particular axial, section of a crankshaft, and a centrifugal pendulum which is secured, in particular directly, to the crankshaft segment. The centrifugal pendulum serves to absorb the natural vibration of the crankshaft. Torsional vibrations/rotation of the crankshaft can therefore be eliminated by the centrifugal pendulum. The centrifugal pendulum is preferably tuned to higher vibration orders; for example, to vibration orders greater than a first order, preferably greater than a second order. For example, the centrifugal pendulum can be tuned to a third order, a fourth order, a four-and-a-halfth order, a sixth order or the like.

The centrifugal pendulum has a carrier secured to the crankshaft segment and at least one pendulum mass that moves relative to the carrier along a predetermined track. In order to fulfill the resonance condition for compensating for torsional vibrations, the track preferably has sections in the circumferential direction and in the radial direction.

In particular, the crankshaft segment can have a mass region arranged eccentrically (to the axis of rotation of the crankshaft/of the crankshaft segment) through which an imbalance arises/is forced during operation/rotation of the crankshaft assembly. The mass region is formed, for example, by a connecting rod bearing region of the crankshaft segment.

The crankshaft assembly has a friction device, in particular non-rotatably secured to the carrier, which rests against the at least one pendulum mass in such a way that when the pendulum mass moves relative to the carrier, the friction device applies a frictional torque counteracting the relative movement to the pendulum mass. This has the advantage that the additional friction, which acts on the relative movement/oscillating movement of the centrifugal pendulum, in particular the pendulum masses, improves isolation of the natural vibration of the crankshaft and a required vibration angle can be reduced. In this way, the functional parameters such as mass, vibration angle and friction can be provided to the required extent.

The friction device extends over a peripheral section of less than 360°. This means that the friction device is not designed to extend completely circumferentially in the circumferential direction. A circumferential direction is defined in particular in relation to an axis of rotation of the crankshaft segment. This has the advantage that the friction device can only be formed in that region in which it is required. In addition, a non-circumferential friction device has an advantageous effect on compensating for an imbalance caused by the crankshaft segment. The peripheral section can preferably be between 90° and 270°, in particular between 180° and 270°.

According to a preferred embodiment, the at least one pendulum mass extends over a predetermined peripheral section. The peripheral section over which the friction device extends can correspond in particular to the predetermined peripheral section. Thus, a normal force/axial force and a friction element contact are provided by the friction device only in the region of the pendulum mass(es). In addition, this has the advantage that the friction device does not require an additional contact surface in a region in which the pendulum mass(es) are not formed.

According to an advantageous development, the friction device can be segmented, in particular essentially in the form of an annular (circular) sector. Such a shape has proven to be particularly advantageous for use in a crankshaft segment.

According to the preferred embodiment, the friction device can have a friction element resting against the pendulum mass, a receiving disc non-rotatably connected to the carrier and a spring element supporting/tensioned axially between the friction element and the receiving disc. A normal/axial force is applied to the friction element by the spring element and presses the friction element axially against the pendulum mass.

The receiving disc can preferably be formed over a peripheral section of less than 360°, for example between 90° and 270°, in particular between 180° and 270°. Alternatively or additionally, the friction element can preferably be formed over a peripheral section of less than 360°, for example between 90° and 270°, in particular between 180° and 270°. Alternatively or additionally, the spring element can preferably be formed over a peripheral section of less than 360°, for example between 90° and 270°, in particular between 180° and 270°.

According to the preferred embodiment, the friction device can additionally have a cover disc arranged axially between the spring element and the friction element. In providing the cover disc, a contact surface between the spring element and the friction element, i.e., to the friction element, can be enlarged, so that a permissible surface pressure of the friction element is not exceeded.

The cover disc can preferably be formed over a peripheral section of less than 360°, for example between 90° and 270°, in particular between 180° and 270°.

According to a preferred embodiment, the friction device can be arranged in the circumferential direction essentially opposite the mass region of the crankshaft segment that generates the imbalance and is in particular arranged eccentrically to the axis of rotation. This has the advantage that eliminating the mass of the friction device in the mass region can contribute to compensating for the imbalance.

According to a preferred embodiment, the friction device can be of axisymmetric design. In particular, an axis of symmetry of the friction device can correspond to an axis of symmetry of the mass region, which orthogonally intersects the axis of rotation, for example. Such a configuration has a particularly advantageous effect on concentricity/imbalance compensation of the crankshaft segment.

According to a particularly preferred embodiment, the mass of the centrifugal pendulum can be dimensioned and the position on the crankshaft segment selected so that the centrifugal pendulum in operation, i.e., during rotation of the crankshaft segment, has an imbalance-compensating effect on the crankshaft segment. The friction device can be viewed as part of the centrifugal pendulum. This means that the centrifugal pendulum and/or the friction device as such forms an imbalance compensation mass for the crankshaft/ the crankshaft segment. The centrifugal pendulum thus replaces an unbalanced mass (which should otherwise be provided, i.e., if there is no centrifugal pendulum). It can therefore be said that an imbalance occurring during rotation of the crankshaft segment is predominantly or completely compensated for by the selection of the mass of the centrifugal pendulum and a securing location of the centrifugal pendulum on the crankshaft segment.

This has the advantage that the centrifugal pendulum not only fulfills the actual absorption function, but also acts as a form of imbalance compensation. Due to this dual function of the centrifugal pendulum, the total mass/the total weight of the crankshaft assembly (or the crankshaft) does not increase due to the provision of the centrifugal pendulum. Since the centrifugal pendulum replaces an imbalance mass, the individual mass/weight of the crankshaft segment is reduced by the imbalancing mass replaced/eliminated by material removal, which in turn corresponds to the individual mass/weight of the added centrifugal pendulum. Put simply, the weight of the crankshaft remains the same with and without the centrifugal pendulum. In other words, an unbalanced mass of the crankshaft has an additional centrifugal pendulum function.

According to a preferred embodiment, the crankshaft segment can have a front-side recess for enveloping at least part of the centrifugal pendulum. The recess can in particular be dimensioned/have such a dimension that the recess has an imbalance-compensating effect when the crankshaft segment rotates. This means that, in particular, so much material/mass is removed for the recess that it is compensated for again by the provision of the additional components, namely the centrifugal pendulum. The recess can be provided subsequently by machining or already in the raw part on the crankshaft segment. Manufacturing costs can be saved as a result.

According to the preferred embodiment, the volume of the recess can be at least partially compensated for by the volume of the centrifugal pendulum (and/or the friction device). In other words, the recess is arranged in such a way that the volume can be used to arrange the components such as the centrifugal pendulum.

In particular, the recess can be arranged in the axial direction essentially at the same height as the mass region of the crankshaft segment. The recess can also be arranged essentially opposite the mass region in the circumferential direction. Furthermore, it can be expedient to arrange the recess essentially radially at the same distance from the axis of rotation as the mass region, for example a center of gravity of the mass region, is away from the axis of rotation (in the other direction).

According to an advantageous embodiment, the centrifugal pendulum can have several pendulum masses. In particular, according to the advantageous embodiment, the pendulum masses can be arranged asymmetrically in the circumferential direction. The imbalance properties of the crankshaft assembly can be favorably influenced by the non-uniform distribution over the circumference.

Alternatively or additionally, according to a preferred embodiment, the pendulum masses, in particular a resulting center of gravity of the pendulum mass(es), can be arranged essentially opposite the mass region of the crankshaft segment in the circumferential direction.

According to a preferred embodiment, a centering region for centered accommodation of the centrifugal pendulum can be formed on a radial outer circumference of the crankshaft segment. The centering region can be provided later by machining or already in the raw part on the crankshaft segment. Manufacturing costs can be saved as a result.

According to a preferred embodiment, a screw-on surface to which the centrifugal pendulum is secured can be formed on an axial end face of the crankshaft segment. Due to the axial attachment, a required vibration angle of the centrifugal pendulum can be implemented particularly easily. The screwing surface can be machined later or already provided in the raw part on the crankshaft segment. Manufacturing costs can be saved as a result. Preferably, threaded bores can be provided in the crankshaft segment in the region of the screwing surface, so that the centrifugal pendulum (the carrier) can be easily screwed in.

It is particularly preferred if the screw-on surface is arranged radially outside of a connection region of the crankshaft segment, wherein the connection region is designed to connect a second adjacent crankshaft segment to the crankshaft segment. This ensures that the crankshaft segment is not inadmissibly weakened in its stress-critical region due to the securing of the centrifugal pendulum. For example, the screw-on surface can be arranged essentially opposite the mass region of the crankshaft segment in the circumferential direction.

It is further preferred if the friction device and the centrifugal pendulum are attached to the crankshaft segment, for example to the screw-on surface, via a common securing device. This has the advantage that, for example, the number of threaded holes can be reduced so that the crankshaft segment is weakened as little as possible.

In one embodiment, the friction device can be designed to run around in the circumferential direction. For example, the friction element can have the shape of a circular ring in cross section, i.e., it can be designed as a friction ring. A rotationally symmetrical design of the friction element means that it can be manufactured particularly inexpensively and assembled easily.

The receiving disc can be designed, for example, as a beveled sheet metal component. For example, the receiving disc is manufactured without the use of cutting methods, for example as a formed component, in particular a deep-drawn component. The receiving disc can preferably have two radial sections connected to one another via an axial section, resulting in a substantially S-shape in longitudinal section. A first (inner) radial section can serve as a securing section for attachment to the crankshaft segment. A second (outer) radial section can serve as a support section for axially supporting the spring element and/or the friction element. The receiving disc can be folded over at its radially outer end, i.e., it can have an axial projection against which the friction element rests in the circumferential direction.

The spring element can be designed as a disc spring or a wave spring. In particular, the spring element can be attached to the receiving disc in a rotationally fixed manner. For example, the spring element can be non-rotatably attached to the receiving disc by a riveted connection.

According to a preferred embodiment, the crankshaft assembly can have a burst protection (catcher) that is fixed in particular to the crankshaft segment and that surrounds the centrifugal pendulum radially on the outside in such a way that components of the centrifugal pendulum that come loose when the centrifugal pendulum rotates are caught and/or braked by the burst protection. In other words, the centrifugal pendulum is enveloped by the burst protection, so that it is encompassed/enclosed radially on the outside. This has the advantage that components that come loose as a result of the rotation cannot be thrown outwards in an uncontrolled manner. The burst protection accordingly forms a barrier for components flying outwards due to the centrifugal force, as a result of which damage to other components of the motor vehicle drive train can be prevented.

According to a preferred embodiment, the burst protection can have a radial section, which extends radially outwards on a first axial side of the centrifugal pendulum (opposite the crankshaft segment), and an outer axial section, which extends radially outside of the centrifugal pendulum from the radial section, in particular from a radially outer end of the radial section, in the axial direction to a second (crankshaft segment facing) axial side of the centrifugal pendulum. In other words, the burst protection extends on a radial outer side of the centrifugal pendulum in the direction of the crankshaft segment. In particular, the outer axial section extends at least far enough for the pendulum mass(es) to be completely covered in the axial direction. In particular, the radial section extends radially so far outwards that it extends radially outwards beyond the centrifugal pendulum (the pendulum mass). The outer axial section and the radial section are connected, for example, via an offset/curvature.

According to the preferred embodiment, the outer axial section can extend over a peripheral section of less than 360°, preferably between 90° and 270°. In other words, the outer axial section has a cross section in the shape of a circular arc. In particular, the outer axial section only extends over that peripheral section in which the pendulum mass(es) is arranged. This has the advantage that the burst protection is only formed where it has to fulfill its function, so that material and thus weight can be saved. In particular, the space required for the crankshaft segment is not restricted by the burst protection.

According to the preferred embodiment, the friction device, in particular the receiving disc, can form the burst protection. This means that a component, in particular the receiving disc, is extended in such a way that it surrounds the centrifugal pendulum radially on the outside and can serve as burst protection. This has the advantage that no additional component has to be provided to form the burst protection. Due to its structure, the receiving disc can be lengthened in a particularly suitable manner without affecting other functions of the receiving disc or the centrifugal pendulum.

The receiving disc can preferably be designed as a beveled sheet metal component. A sheet metal component can be brought into a desired beveled shape in a particularly simple manner. Beveled is understood here in particular to mean that the receiving disc has a radial section and an outer axial section as well as an inner axial section which extends from a radially inner end of the radial section in the axial direction, in particular in the direction of the second axial side of the centrifugal pendulum. Thus, the radial section and the two axial sections form a U-shape in longitudinal section, within which the pendulum mass(es) of the centrifugal pendulum is/are arranged (so that the pendulum mass(es) are encompassed). The beveled offset of the receiving disc improves the stability of said component.

In particular, the receiving disc can be formed without the use of cutting methods, for example as a formed component, preferably as a deep-drawn component. The geometry, in particular the U-shape and/or the S-shape, can thus be produced easily.

According to a preferred embodiment, the friction element can be accommodated on its radial outside in a rotationally fixed manner in the receiving disc, in particular the axial section of the burst protection/the receiving disc. As a result, the friction element can be arranged radially further to the outside, so that the friction surface is advantageously enlarged.

According to the preferred embodiment, the friction element can have projections protruding radially outwards, which engage in corresponding recesses of the receiving disc to prevent rotation. In other words, the anti-rotation device is implemented by recesses in the receiving disc and penetrations in the friction element. In this way, the friction element can be attached to the receiving disc in a form-fitting, non-rotatable manner that is simple to manufacture.

According to the preferred embodiment, the receiving disc can alternatively (or additionally) have radially inwardly protruding deformed regions, for example in the manner of an arc spring stop in a dual-mass flywheel, which engage in corresponding pockets of the friction element to prevent rotation. In this way, the friction element can be attached to the receiving disc in a form-fitting, non-rotatable manner that is simple to manufacture.

According to a preferred embodiment, the friction element can rest axially against the radial section of the receiving disc. The fact that the friction element is supported over a large area on both sides advantageously prevents the friction element from tilting.

According to a preferred embodiment, the carrier of the centrifugal pendulum can be extended on a side opposite the pendulum mass in the circumferential direction in such a way that the friction device bears against the carrier. This means that the carrier forms an abutment for the friction device on the side opposite the pendulum mass in the circumferential direction. This has the advantage that even with an asymmetric arrangement of the pendulum mass(es) over the circumference in the angular range within which the friction device has no abutment from the pendulum mass(es), one-sided load and misalignment of the friction device can be avoided or counteracted. In other words, the missing abutment is compensated for by the particular geometry of the carrier of the centrifugal pendulum. Thus, a part of the carrier is provided for receiving the pendulum mass(es) and the remaining part is designed in such a way that it provides a contact surface for the friction device.

In particular, the friction element of the friction device can rest against (or be supported on) the carrier. This means that the friction element rests against the pendulum mass(es) in a first peripheral region and rests against the carrier in another, in particular substantially opposite, second peripheral region. A one-sided load on the friction element is thus avoided.

The friction device can preferably rest on the at least one pendulum mass and on the carrier on the same axial side. This has the advantage that the normal force applied by the spring element can be supported uniformly and/or over a (large) area.

According to an advantageous development, the carrier can have a bearing section extending in the radial direction for receiving the at least one pendulum mass and a contact section extending in the radial direction for supporting the friction device. The bearing section and the contact section are preferably arranged spaced apart parallel to one another in the axial direction. As a result, a flat contact surface for the friction device can be provided in an advantageous manner and at the same time the bearing of the pendulum mass on the carrier can be guaranteed.

According to the advantageous development, an axial distance between the bearing section and the contact section can essentially correspond to the thickness of the at least one pendulum mass. This has the advantage that a flat friction element can rest axially flush against the pendulum mass and the contact section or can be supported on it.

According to the embodiment, the bearing section and the contact section may be connected by a connecting section of the bracket, so that the bracket has a substantially S-shape in longitudinal section. This ensures sufficient rigidity and strength of the carrier.

In addition, it has proven to be advantageous if the contact section is formed by displacing the carrier in the direction of the friction device. In this way, the required shape of the carrier can be produced with little effort.

Furthermore, it is expedient if the carrier is designed as a sheet metal part. For example, the carrier can be manufactured without the use of cutting methods. In particular, the carrier can be produced by stamping and forming, for example by deep-drawing. The carrier can thus be produced inexpensively and in large quantities.

The contact section can preferably have the shape of an arc of a circle in cross section. This has the advantage that the contact section provides a suitable contact surface for a simple design of the friction element.

In other words, the disclosure relates to a crankshaft assembly in which a centrifugal pendulum subassembly is arranged on an imbalance compensation flange of a crankshaft segment. Provided on the crankshaft segment is a recess for the centrifugal pendulum subassembly, which is machined or already formed as a raw part so that a centering seat, as well as a screw-on surface and an area in which the pendulum mass(es) can move. A centrifugal pendulum carrier (flange) is arranged on the screw-on surface, which is screwed into threaded holes in the crankshaft segment in the non-stress-critical region. Additional friction, which acts on the centrifugal pendulum movement, is provided by a friction device, which improves the isolation of the natural vibration of the crankshaft and reduces the required vibration angle. The friction device has a beveled receiving disc. A disc spring is supported on the one hand on the receiving disc and on the other hand a normal force acts on a friction element, which in turn rests on the pendulum mass. If necessary, a cover disc can also be provided between the disc spring and the friction element, so that the permissible surface pressure of the friction element is not exceeded. The friction element is designed to be non-rotatable with the receiving disc, so that the friction point is secured between the friction element and the pendulum mass. The pendulum masses are arranged asymmetrically around the circumference so that they serve to compensate for the imbalance in the crankshaft. In particular, the friction device cannot be circumferential but only designed as a ring segment, whereby a normal force and friction ring contact is provided in the required region of the pendulum mass and there is no exposed region of the friction device that needs to be supported. In this way, eliminating the mass of the friction device in the region that is not required can also compensate for an imbalance caused by the mass of the crankshaft segment that has been removed for the centrifugal pendulum. A receiving disc, a spring element, a friction element and a cover disc can be segmented/not circumferential, but only present in the region of the pendulum masses. Alternatively or additionally, a burst protection can preferably be integrated into the receiving disc (support disc/receiving plate), for which purpose the receiving plate is extended radially outwards to envelope the centrifugal pendulum. Anti-rotation means between the receiving plate and the friction element (friction ring) can be implemented by means of recesses in the receiving plate and penetrations in the friction element, or alternatively by means of formed regions in the receiving plate, which engage in corresponding recesses in the friction element. Furthermore, in particular in the case of a non-symmetrical arrangement of the pendulum masses in the circumferential direction, the carrier of the centrifugal pendulum can be designed in such a way that it forms an abutment for the friction device. Thus, only a part of the carrier is provided for accommodating the pendulum masses and the remaining area is designed in such a way that a contact surface is provided for the friction device. More preferably, this contact surface can be formed by an annular region that is enveloped in the direction of the friction device.

BRIEF DESCRIPTION OF THE DRAWINGS

The disclosure is explained below with the aid of drawings. In the figures:

FIGS. 1 and 2 show a longitudinal sectional view and a plan view of a crankshaft assembly in a first embodiment, FIGS. 3 and 4 show a longitudinal sectional view and a plan view of a crankshaft assembly in a second embodiment, FIGS. 7 to 9 show a longitudinal sectional view and a perspective view of a crankshaft assembly in a fourth embodiment.

DETAILED DESCRIPTION

Figure 5:
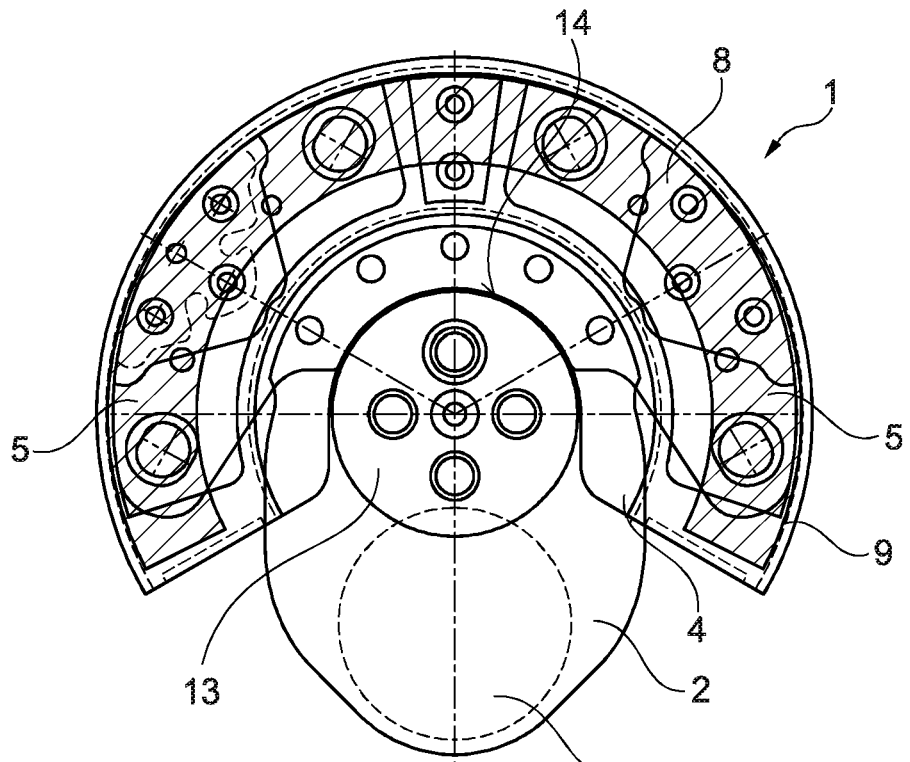
FIGS. 5 and 6 show a longitudinal sectional view and a plan view of a crankshaft assembly in a third embodiment.

The figures are only schematic in nature and serve only for understanding the disclosure. The same elements are provided with the same reference numerals. The features of the individual embodiments can be interchanged.

FIGS. 1 to 9 show different embodiments of a crankshaft assembly 1 for a motor vehicle drive train. The crankshaft assembly 1 has a crankshaft segment 2. The crankshaft segment 2 is, in particular, an axial section of a crankshaft. The crankshaft assembly 1 has a centrifugal pendulum 3 attached to the crankshaft segment. The centrifugal pendulum 3 serves to absorb a natural vibration of the crankshaft or a main order of excitation of the motor vehicle drive train.

The centrifugal pendulum 3 has a carrier 4 secured to the crankshaft segment. The carrier 4 is therefore attached to the crankshaft segment 2 in a rotationally fixed manner. The centrifugal pendulum 3 also has a pendulum mass 5. The pendulum mass 5 is attached to the carrier 4 so that it can move relative to the carrier 4 along a predetermined track. The absorbing effect of the centrifugal pendulum 3 is achieved by the relative movement between the pendulum mass 5 and the carrier 4. In the illustrated embodiments, the centrifugal pendulum 3 has a plurality of pendulum masses 5 which are arranged asymmetrically in the circumferential direction/over the circumference. The circumferential direction is defined in relation to an axis of rotation of the crankshaft segment 2.

The mass of the centrifugal pendulum 3 is dimensioned and its position on the crankshaft segment 2 is arranged in such a way that the centrifugal pendulum 3 acts on the crankshaft segment 2 to compensate for imbalance during operation, i.e., when the crankshaft segment 2 is rotating. The crankshaft segment 2 has a mass region 6 that generates an imbalance during operation. The mass region 6 is arranged eccentrically to the axis of rotation. The mass and the position of the centrifugal pendulum 3 is therefore matched to the mass and the position of the mass region 6. The centrifugal pendulum 3 (in particular its pendulum masses 5) are arranged opposite to the mass region 6 in the circumferential direction. The centrifugal pendulum 3 is arranged in the axial direction (relative to the axis of rotation) at the same height as the mass region 6. The pendulum masses 5 are radially spaced apart at the same distance from the axis of rotation as the mass region 6. In other words, the centrifugal pendulum 3 serves as an imbalance compensation element for the mass region 6. This means that the centrifugal pendulum 3 replaces an imbalanced mass for the crankshaft segment 2 (partially or completely).

The crankshaft assembly 1 has a friction device 7 connected to the carrier 4. The friction device 7 is attached to the carrier 4 and/or to the crankshaft segment 2 in a torque-proof manner. The friction device 7 rests against the at least one pendulum mass 5 in such a way that when the pendulum mass 5 moves relative to the carrier 4, the friction device 7 applies a frictional torque counteracting the relative movement to the pendulum mass 5. The friction device 7 has a friction element 8 in contact with the pendulum mass 5. The friction device 7 has a receiving disc 9 which is non-rotatably connected to the carrier 4. The friction element 8 is connected to the receiving disc 9 in a non-rotatable manner. The friction device 7 has a spring element 10 that is supported, in particular braced, axially between the friction element 8 and the receiving disc 9. The spring element 10 is designed, for example, as a disc spring or a wave spring. The spring element 10 applies a normal/axial force to the friction element 8, which presses the friction element 8 axially against the pendulum mass 5, so that when there is a relative movement between the friction element 8 secured to the carrier and the at least one pendulum mass 5, the friction torque that counteracts the relative movement occurs.

The crankshaft segment 2 has an imbalance compensation flange 11. The imbalance compensation flange 11 is located opposite the mass region 6 in the circumferential direction. The crankshaft segment 2 has a front-side recess 12 (in the imbalance compensation flange 11) for receiving at least part of the centrifugal pendulum 3, in particular the pendulum masses 5. The recess 12 is dimensioned in such a way that it has an imbalance-compensating effect when the crankshaft segment 2 rotates. In particular, the mass removed for the recess 12 corresponds to a mass added by the centrifugal pendulum 3.

The crankshaft segment 2 has a connection region 13 which is designed to attach an (axially adjacent) second crankshaft segment to it. The connection region 13 is arranged centrally on the crankshaft segment 2. The recess 12 is arranged radially outside the connection region 13. The crankshaft segment 13 has a centering region 14 on its radial outer circumference for receiving the centrifugal pendulum-type pendulum 3 in a centered manner. The crankshaft segment 13 has a screw-on region/surface 15 on an axial end face, to which the centrifugal pendulum 3/the carrier 4 is secured. The screw-on surface 15 is arranged radially outside the connection region 13. The centrifugal pendulum 3 is attached axially to the screw-on surface 15 via a securing device 16, in particular in the form of a plurality of screws. For this purpose, threaded bores are provided in the screw-on surface 15, into which the securing device 16 is screwed.

The receiving disc 9 of the friction device 7 is designed as a beveled sheet metal component. The receiving disc 9 has an (inner) first radial section 17 serving as a securing section. The radial section 17 is firmly attached to the carrier 4 and the crankshaft segment 2 via the securing device. From a radially outer end of the first radial section 17, an axial section 18 extends in the axial direction away from the crankshaft segment 2/the screw-on surface 15. The axial section 18 extends radially within the pendulum masses 5. An (outer) second radial section 19 extends outwards in the radial direction from an axially distanced end of the axial section 18. As a result, the receiving disc 9 has an S-shape at least in sections. The spring element 10 and/or the friction element 8 are supported axially on the receiving disc 9 in the region of the second radial section 19. An axial projection 20 extends in the axial direction toward the pendulum masses 5 from a radially outer end of the second radial section 19. The spring element 10 and/or the friction element 8 are supported on the axial projection 20 in the circumferential direction.

In the embodiment shown, the centrifugal pendulum 3 has a plurality of pendulum mass packages. Each pendulum mass package has two pendulum masses 5, which are held by one or more spacing elements 21 spaced axially parallel. The two pendulum masses 5 are connected to one another by a rivet 22, for example.

FIGS. 1 and 2 show a first embodiment of the crankshaft assembly 1. FIG. 1 shows a plan view without the friction device 7. The carrier 4 has a central through hole 23 via which the carrier 4 is centered on the centering region 14. In the first embodiment, the friction element 8 is designed as a friction ring running in the circumferential direction. The friction element 8 has form-fitting elements 24 on its radial inner side, which engage with corresponding recesses 25 in the receiving disc 9 for form-fitting anti-rotation protection. The friction element 8 is thus fastened radially on the inside. The receiving disc 9 is designed to run around in the circumferential direction. The second radial section 19 and/or the axial projection 20 is designed rotationally symmetrical.

FIGS. 3 and 4 show a second embodiment of the crankshaft assembly 1. Only differences from the first embodiment are explained below. The friction device 7 has an additional cover disc 26 which is arranged in the axial direction between the spring element 10 and the friction element 8. The crankshaft assembly 1 has a burst protection 27. The burst protection 27 surrounds the centrifugal pendulum 3 radially on the outside. As a result, when the centrifugal pendulum 3 rotates, loose components are caught by the burst protection 27. Burst protection 27 is formed by the receiving disc 9. The second radial section 19 is extended radially outwards, so that it protrudes radially outwards beyond the pendulum masses 5. From a radially outer end of the second radial section 19, an outer axial section 28 extends in the axial direction towards the crankshaft segment 2. The outer axial section 28 extends axially beyond the pendulum masses 5. This means that the axial projection 20 is lengthened in the axial direction, at least in the peripheral region of the pendulum masses 5, in order to form the outer axial section 28. The pendulum masses 5 are accordingly enveloped by the receiving disc 9. To form the burst protection 27, the receiving disc 9 has a beveled U-shape, which axially encompasses the pendulum masses 5. The friction element 8 is fastened radially on the outside of the receiving disc 9 to prevent rotation. For example, the friction element 8 and the receiving disc 9 engage with one another. The friction element 8 is supported in a radially inner region on the cover disc 26 and in a radially outer region on the receiving disc 9. The carrier 4 extends approximately in the shape of a crescent in the region of the pendulum masses 5.

Figure 6:
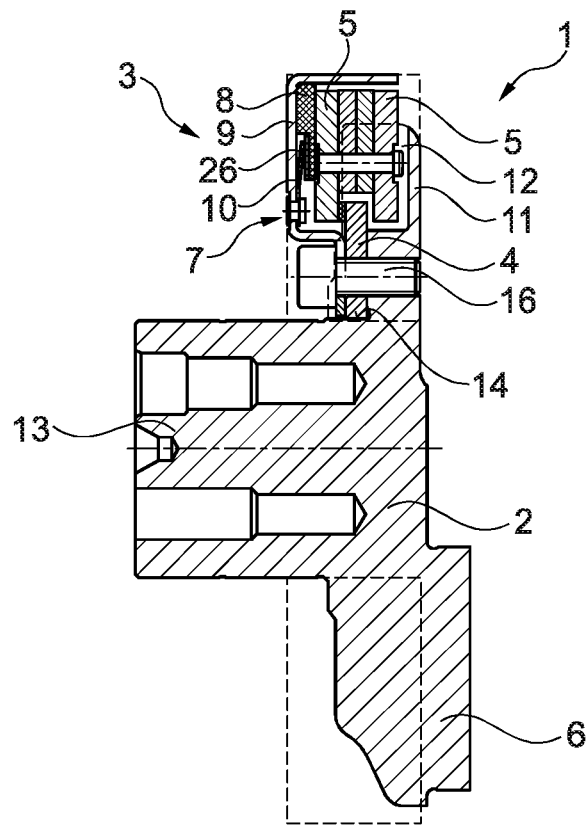

FIGS. 5 and 6 show a third embodiment of the crankshaft assembly 1. Only differences from the first or second embodiment are explained below. In the third embodiment, the friction device 7, in particular the receiving disc 9, the friction element 8, the spring element 10 and/or the cover disc 26, extends over a peripheral section of less than 360°. This means that the friction device 7 is not designed to be completely circumferential in the circumferential direction. The peripheral section is between 90° and 270°, in particular between 180° and 270°. The peripheral section essentially corresponds to a predetermined peripheral section over which the pendulum masses 5 extend. The friction device 7 is segmented, in the embodiment shown in the form of a circular (ring) sector. The friction device 7 can be regarded as part of the centrifugal pendulum 3, so that the configuration, dimensioning and positioning of the friction device 7 also has an imbalance-compensating effect on the crankshaft segment 2 during operation.

FIGS. 7 to 9 show a fourth embodiments of the crankshaft assembly 1. Only differences from the first, second or third embodiment are explained below. In the fourth embodiment, the carrier 4 of the centrifugal pendulum 3 is extended on a side opposite the pendulum masses 5 in the circumferential direction in such a way that the friction device 7 rests against the carrier 4. The carrier 4 thus extends in the radial direction and circumferential direction up to the mass region 6. The carrier 4 has a connecting section in the form of an axial beveled section 29 which connects a first radial section 30 adjacent to the pendulum masses 5 in the circumferential direction to a second radial section 31 adjacent to the mass region 6 in the circumferential direction. The second radial section 31 is enveloped in the direction of the friction device 7. The first radial section 30 is arranged spaced apart axially and parallel to the second radial section 31. The first radial section 30 serves as a bearing section for receiving the pendulum masses 5. The second radial section 31 serves as a contact section against which the friction device 7 rests. In particular, the friction element 8 rests on the same axial side in one peripheral section against the second radial section 31 and in another peripheral section against the pendulum masses 5. The carrier 4 has a through hole 32. The through hole 32 is formed eccentrically. In a region adjacent to the pendulum masses 5 in the circumferential direction, a radial inner side/surface of the carrier 4 rests against the centering region 14. The through-hole 32 extends further radially outwards in a region adjacent to the mass region 6 in the circumferential direction, so that the carrier 4 rests against the crankshaft segment 2 only over a peripheral section that is less than 360°.

LIST OF REFERENCE SYMBOLS

1 Crankshaft assembly
2 Crankshaft segment
3 Centrifugal pendulum
4 Carrier
5 Pendulum mass
6 Mass region
7 Friction device
8 Friction element
9 Receiving disc
10 Spring element
11 Imbalance compensation flange
12 Recess
13 Connection region
14 Centering region
15 Screw-on surface
16 Securing device
17 First radial section
18 Axial section
19 Second radial section
20 Axial projection
21 Spacing element
22 Rivet
23 Through hole
24 Form-fitting element
25 Recess
26 Cover disc
27 Burst protection
28 Axial section
29 Beveled section
30 First radial section
31 Second radial section
32 Through hole

The invention claimed is:

1. A crankshaft assembly for a motor vehicle drive train, the crankshaft assembly comprising:
   a crankshaft segment;
   a centrifugal pendulum secured to the crankshaft segment, the centrifugal pendulum having a carrier that is secured to the crankshaft segment and at least one pendulum mass that moves relative to the carrier along a predetermined track;
   a friction device connected to the carrier which rests on the at least one pendulum mass such that, with a relative movement of the at least one pendulum mass in relation to the carrier, the friction device applies a frictional torque on the pendulum mass counteracting the relative movement; and
   the friction device extends over a peripheral section between 90° and 270°.

2. The crankshaft assembly according to claim 1, wherein the at least one pendulum mass extends over a predetermined peripheral section, and the peripheral section over which the friction device extends corresponds to the predetermined peripheral section.

3. The crankshaft assembly according to claim 1, wherein the friction device is segmented.

4. The crankshaft assembly according to claim 1, wherein the friction device has a friction element which rests on the pendulum mass, a receiving disc secured to the carrier and a spring element axially supporting between the friction element and the receiving disc, and at least one of the receiving disc, the friction element or the spring element are formed over a peripheral section of less than 360°.

5. The crankshaft assembly according to claim 1, wherein the friction device is arranged opposite a mass region of the crankshaft segment generating an imbalance in a circumferential direction.

6. The crankshaft assembly according to claim 5, wherein the friction device is axially symmetrical, and an axis of symmetry of the friction device corresponds to an axis of symmetry of the mass region.

7. The crankshaft assembly according to claim 1, wherein at least one of the centrifugal pendulum or the friction device is dimensioned in relation to the mass(es) and a position on the crankshaft segment is selected such that the at least one of the centrifugal pendulum or the friction device acts on the crankshaft segment to compensate for any imbalance when the crankshaft segment rotates.

8. The crankshaft assembly according to claim 7, wherein the crankshaft segment has a front-side recess for receiving at least part of at least one of the centrifugal pendulum or the friction device, and the front-side recess is dimensioned to compensate for any imbalance when the crankshaft segment rotates.

9. The crankshaft assembly according to claim 7, wherein a screw-on surface is formed on an axial end face of the crankshaft segment, on which the friction device and the centrifugal pendulum are attached via a common securing device.

10. A crankshaft assembly for a motor vehicle drive train, the crankshaft assembly comprising:
   a crankshaft segment;
   a centrifugal pendulum secured to the crankshaft segment, the centrifugal pendulum having a carrier that is secured to the crankshaft segment and two pendulum masses that move relative to the carrier along a predetermined track; and
   a friction element connected to the carrier which rests on the pendulum masses such that, with a relative movement of the pendulum masses in relation to the carrier, the friction element applies a frictional torque on the pendulum mass counteracting the relative movement, wherein the friction element comprises a friction ring that is part of a friction device that extends over a peripheral section of less than 360° and presses the friction ring against the pendulum masses.

11. The crankshaft assembly according to claim 10, wherein the peripheral section is between 90° and 270°.

12. The crankshaft assembly according to claim 11, wherein the pendulum masses extend over a predetermined peripheral section, and the peripheral section over which the friction element extends corresponds to the predetermined peripheral section.

13. The crankshaft assembly according to claim 10, wherein the friction device includes a receiving disc secured to the carrier and a spring element axially supporting between the friction element and the receiving disc, and at least one of the receiving disc or the spring element are formed over a peripheral section of less than 360°.

14. The crankshaft assembly according to claim 10, wherein the friction device is arranged opposite a mass region of the crankshaft segment generating an imbalance in a circumferential direction.

15. The crankshaft assembly according to claim 14, wherein the friction device is axially symmetrical, and an axis of symmetry of the friction device corresponds to an axis of symmetry of the mass region.

16. The crankshaft assembly according to claim 10, wherein at least one of the centrifugal pendulum or the friction device is dimensioned in relation to the pendulum masses and a position on the crankshaft segment is selected such that the at least one of the centrifugal pendulum or the friction device acts on the crankshaft segment to compensate for any imbalance when the crankshaft segment rotates.

17. The crankshaft assembly according to claim 16, wherein the crankshaft segment has a front-side recess for receiving at least part of at least one of the centrifugal pendulum or the friction device, and the front-side recess is dimensioned to compensate for any imbalance when the crankshaft segment rotates.

18. The crankshaft assembly according to claim 16, wherein a screw-on surface is formed on an axial end face of the crankshaft segment, on which the friction device and the centrifugal pendulum are attached via a common securing device.

19. A crankshaft assembly for a motor vehicle drive train, the crankshaft assembly comprising:
   a crankshaft segment comprising a screw-on surface formed on an axial end face of the crankshaft segment;
   a centrifugal pendulum secured to the crankshaft segment, the centrifugal pendulum having a carrier that is secured to the crankshaft segment and at least one pendulum mass that moves relative to the carrier along a predetermined track;
   a friction device connected to the carrier which rests on the at least one pendulum mass such that, with a relative movement of the at least one pendulum mass in relation to the carrier, the friction device applies a frictional torque on the pendulum mass counteracting the relative movement; and
   the friction device extends over a peripheral section of less than 360°;
   wherein the friction device and the centrifugal pendulum are attached via a common securing device to the screw-on surface of the crankshaft segment.

* * * * *